United States Patent [19]

Hille et al.

[11] Patent Number: 4,496,675

[45] Date of Patent: Jan. 29, 1985

[54] AQUEOUS DISPERSIONS BASED ON A POLYURETHANE SYNTHETIC RESIN

[75] Inventors: Hans-Dieter Hille, Bergisch Gladbach; Rolf Harten, Münster, both of Fed. Rep. of Germany

[73] Assignee: BASF Farben & Fasern AG, Hamburg, Fed. Rep. of Germany

[21] Appl. No.: 524,358

[22] Filed: Aug. 18, 1983

[30] Foreign Application Priority Data

Aug. 19, 1982 [DE] Fed. Rep. of Germany ....... 3230851

[51] Int. Cl.$^3$ ...................... C08L 93/02; C08L 75/12
[52] U.S. Cl. ........................................ 524/77; 524/591
[58] Field of Search .................... 524/77, 591

[56] References Cited

U.S. PATENT DOCUMENTS

| | | | |
|---|---|---|---|
| 3,539,483 | 11/1970 | Keberle | 524/840 |
| 4,066,591 | 1/1978 | Scriven | 524/840 |
| 4,108,814 | 8/1978 | Reiff | 524/840 |
| 4,203,883 | 5/1980 | Hangauer | 524/591 |
| 4,240,939 | 12/1980 | Kostic | 524/77 |
| 4,306,998 | 12/1981 | Wenzel | 524/37 |
| 4,408,008 | 10/1983 | Markusch | 524/591 |

Primary Examiner—C. Warren Ivy
Attorney, Agent, or Firm—Wells & Wells

[57] ABSTRACT

The invention relates to aqueous dispersions based on a polyurethane synthetic resin which has been obtained by reacting a hydroxyl-containing unsaturated polyester with a diisocyanate and reacting the product with a dihydroxycarboxylic acid, dihydroxysulfonic acid, diaminocarboxylic acid or diaminosulfonic acid, neutralizing the intermediate product with a tertiary amine and transferring it into an aqueous phase, and then reacting the terminal isocyanate groups with a primary and/or secondary diamine, as a chain-lengthening agent. The dispersions contain hydrolyzed shellac as second binder component. They produce coatings having excellent solvent resistance and excellent adhesion, even to difficult substrates.

21 Claims, No Drawings

AQUEOUS DISPERSIONS BASED ON A POLYURETHANE SYNTHETIC RESIN

BACKGROUND OF THE INVENTION

The invention generically relates to aqueous dispersions based on a polyurethane synthetic resin which has been obtained by reacting a hydroxyl-containing polyester with a diisocyanate and reacting the product with a compound which contains at least two groups which react with isocyanate groups and at least one group capable of anion formation, and with a chain-lengthening agent.

Aqueous dispersions of this type are known. German Offenlegungsschrift No. 1,495,745 describes a process for preparing aqueous emulsifierless polyurethane latices based on polyurethane materials prepared from polyhydroxyl compounds, polyisocyanates and, if appropriate, chain-lengthening agents.

The existing dispersions of this generic type have the disadvantage that if they are dried physically without the addition of a hardening agent they do not give solvent-resistant coatings. The coatings are sensitive, in particular to acetone but also to other solvents, which severely impairs their usefulness.

SUMMARY OF THE INVENTION

It is the object of the present invention to avoid this state of the art disadvantage and to specify aqueous dispersions which are based on a polyurethane synthetic resin and which harden into solvent-resistant coatings in the absence of hardening agent, and a process for their preparation. The dispersions should give firmly adhering and hard coatings even on difficult substrates, such as polyethylene or polyvinyl chloride, and the applied coating films should harden rapidly.

Applicants have now found, surprisingly, that this object can be achieved by means of dispersions of the type in question if they contain, as binder, a polyurethane synthetic resin which contains an unsaturated polyester component as essential building block, and hydrolyzed shellac.

DESCRIPTION OF THE PREFERRED EMBODIMENTS

The invention thus relates to aqueous dispersions based on a polyurethane synthetic resin, wherein the polyurethane synthetic resin has been obtained by reacting an unsaturated polyester or a mixture of an unsaturated polyester and a linear diol having a molecular weight of 500 to 2,000, the polyester, or the mixture, containing at least 0.4 olefinically unsaturated double bonds per 1,000 molecular weight units, with the diisocyanate to give a first intermediate product having terminal isocyanate groups, reacting this intermediate product with the compound which contains at least two groups which react with isocyanate groups and at least one group capable of anion formation to give a second intermediate product having terminal isocyanate groups, the groups capable of anion formation having been neutralized by means of a tertiary amine before the reaction, transferring the second intermediate product into a predominantly aqueous phase, and reacting the isocyanate groups of the second intermediate product with a diamine and/or polyamine having primary and/or secondary amino groups, and there is present, as a further binder, base-hydrolyzed shellac, where, in each case based on the solids content, the polyurethane synthetic resin content is 40 to 70% by weight, the hydrolyzed shellac content is 60 to 30% by weight, and the two components add up to 100%.

For the purposes of the present invention, polyesters are polycondensates of polyols and polycarboxylic acids, in particular linear polycondensates of a diol and a dicarboxylic acid. Unsaturated polyesters are condensates of this type with double bonds, in particular in the main chain of the molecule. These double bonds can come from the diol and/or the dicarboxylic acid, preferred polyesters being those in which the double bonds come from the dicarboxylic acid. Examples of diols suitable for preparing the polyesters are ethylene glycol and its homologs, neopentyl glycol, 2-methyl-2-ethylpropane-1,3-diol, cyclohexanediol and the like.

Examples of suitable dicarboxylic acids are maleic acid, and its anhydride, fumaric acid, citraconic acid, mesaconic acid and itaconic acid. These unsaturated dicarboxylic acids are also used together with saturated dicarboxylic acids, such as glutaric acid, pimelic acid, azelaic acid, sebacic acid or, in particular, adipic acid. Those polyesters are preferred which have been built up with maleic anhydride as unsaturated dicarboxylic acid building block and have a molecular weight of 500 to 2,000.

The polyester for preparing the polyurethane synthetic resin can thus be an unsaturated polyester or a mixture of an unsaturated polyester with a linear diol. The essential point is that the total amount of polyester or mixture contains at least 0.4 olefinically unsaturated double bonds per 1,000 molecular weight units.

Examples of suitble linear diols are saturated hydroxyl-containing polyesters, polyethers, polyesteramides, polyacetates and the like.

Possible for use as diisocyanates are, in particular, aliphatic and cycloaliphatic diisocyanates. Polyisocyanates having more isocyanate groups are also possible, provided care is taken to ensure that there is no premature crosslinking. Examples of suitable diisocyanates are hexamethylene diisocyanate, trimethylhexamethylene diisocyanate, 2,6-diisocyanatomethyl capronate, 4,4'-dicyclohexylmethane diisocyanate and isophorone diisocyanate.

The reaction between the polyester and the diisocyanate is carried out in such a way that the resulting first intermediate product has terminal isocyanate groups, ie. about 2 moles of diisocyanate are used per mole of polyester.

The invention makes use of compounds which contain at least 2 groups which react with isocyanate groups and at least one group capable of anion formation. Suitable groups which react with isocyanate groups are in particular hydroxyl groups and primary and secondary amino groups. Possible groups capable of anion formation are carboxyl and sulfonic acid groups. Before the reaction these groups are neutralized with a tertiary amine to avoid a reaction with the isocyanate groups. The reaction is carried out in such a way that the result is a second intermediate product having terminal isocyanate groups. The molar amounts of the reactants are thus chosen in such a way that the first intermediate product is present in excess.

Examples of compounds which contain at least 2 groups which react with isocyanate groups and at least 1 group capable of anion formation are dihydroxypropionic acid, dimethylolpropionic acid, dihydroxysuccinic acid and dihydroxybenzoic acid. Also suitable are polyhydroxy acids accessible by oxidizing monosaccharides, for example gluconic acid, sugar acid, mucic acid, glucuronic acid and the like.

Examples of compounds containing amino groups are α,δ-diaminovaleric acid, 3,4-diaminobenzoic acid, 2,4-diaminotoluene-5-sulfonic acid, 4,4'-diaminophenoxybenzenesulfonic acid and the like.

The second intermediate product has anionic groups which are neutralized with a tertiary amine. Examples of suitable tertiary amines are trimethylamine, triethylamine, dimethylaniline, diethylaniline, triphenylamine and the like.

The second intermediate product is transferred into an aqueous phase, and the terminal isocyanate groups are reacted with a primary or secondary diamine, as a chain-lengthening agent, to give N-alkylurea groups. Examples of diamines suitable for this purpose are ethylenediamine, diaminopropane, hexamethylenediamine, hydrazine, aminoethylethanolamine and the like. The reaction with the diamine leads to further crosslinking and increases in molecular weight.

The second essential binder component of the dispersions according to the invention is hydrolyzed shellac. It is known per se to prepare aqueous solutions or dispersions of shellac by heating it in water in the presence of such bases as borax, morpholine or ammonia.

It has been found that, for the purpose of the present invention, the use of ammonia gives the best results in respect to the shelflife of the resulting dispersions.

It was surprising that combining the polyurethane synthetic resins described above with hydrolyzed shellac produced dispersions which have outstanding properties and which can be improved still further by adding 1 to 25% by weight, based on the total amount of all components, of wetting agents and/or emulsifiers. The dispersions dry rapidly to give hard coatings which adhere firmly, even to difficult substrates.

The invention also relates to a process for preparing aqueous dispersions based on a polyurethane synthetic resin by reacting a hydroxyl-containing polyester with a diisocyanate to give a first intermediate product and reacting this intermediate product with a compound which contains at least two groups which react with isocyanate groups and at least one group capable of anion formation, and with a chain-lengthening agent.

The process of the invention comprises
reacting an unsaturated polyester or a mixture of an unsaturated polyester and a linear diol having a molecular weight of 500 to 2,000, the polyester, or the mixture, containing at least 0.4 olefinically unsaturated double bonds per 1,000 molecular weight units, with the diisocyanate to give a first intermediate product having terminal isocyanate groups, reacting this intermediate product with the compound which contains at least two groups which react with isocyanate groups and at least one group capable of anion formation to give a second intermediate product having terminal isocyanate groups, the groups capable of anion formation having been neutralized with a tertiary amine before the reaction, transferring the second intermediate product into a predominantly aqueous phase, and reacting the isocyanate groups of the second intermediate product with a diamine and/or polyamine having primary and/or secondary amino groups,
base-hydrolyzing shellac, and
mixing the dispersion of the polyurethane synthetic resin with the hydrolyzed shellac, in the presence or absence of 1 to 25% by weight, based on the total amount of all components, of wetting agents and/or emulsifiers, in such a ratio as to produce a solids content on polyurethane synthetic resin of 40 to 70% by weight and on hydrolyzed shellac of 60 to 30% by weight, the total amount of these components being 100%.

The unsaturated polyester used is advantageously a polyester of maleic anhydride and a diol.

The diisocyanate used is advantageously aliphatic or cycloaliphatic.

It is advantageous to use as the compound which contains at least two groups which react with isocyanate groups and at least one group capable of anion formation dihydroxycarboxylic acids, dihydroxysulfonic acids, diaminocarboxylic acids or diaminosulfonic acids.

The invention also relates to a process for preparing coatings by applying to a substrate an aqueous dispersion based on a polyurethane synthetic resin which has been obtained by reacting a hydroxyl-containing polyester with a diisocyanate and reacting the product with a compound which contains at least two groups which react with isocyanate groups and at least one group capable of anion formation and with a chain-lengthening agent, and then hardening the applied dispersion, wherein
the polyurethane synthetic resin has been obtained by reacting an unsaturated polyester or a mixture of an unsaturated polyester and a linear diol having a molecular weight of 500 to 2,000, the polyester, or the mixture, containing at least 0.4 olefinically unsaturated double bonds per 1,000 molecular weight units, with the diisocyanate to give a first intermediate product having terminal isocyanate groups, reacting this intermediate product with the compound which contains at least two groups which react with isocyanate groups and at least one group capable of anion formation to give a second intermediate product having terminal isocyanate groups, the groups capable of anion formation having been neutralized by means of a tertiary amine before the reaction, transferring the second intermediate product into a predominantly aqueous phase, and reacting the isocyanate groups of the second intermediate product with a diamine and/or polyamine having primary and/or secondary amino groups, and
there is present, as a further binder, base-hydrolyzed shellac, where, in each case based on the solids content, the polyurethane synthetic resin content is 40 to 70% by weight, the hydrolyzed shellac content is 60 to 30% by weight, and the two components add up to 100%.

The dispersions of the invention, which have a long shelflife, can contain pigments and customary additives, such as, for example, delustrants, flow-control agents, thickeners and the like. They can be applied to any substrate, such as wood, paper, metal, mineral substrates, plastics, such as, for example, rigid polyvinyl chloride, glass and the like, by spraying, flow-coating dipping, roll-coating, knife-coating, casting, brushing, spreading or the like. The film which has been applied hardens at room temperatures within about 24 hours to give a solvent-resistant coating. Elevated temperatures result in shorter drying times. For instance, a film applied in a wet-film thickness of 30 μm hardens at 70° to 80° C. in the course of 25 seconds and at 180° C. in the course of 3 seconds. The solvent resistance of the coatings obtained is very good. For instance, paper coated to a 30 μm wet-film thickness and stored for 8 days is resistant to water, methanol, benzine, vinegar, ethanol, olive oil, cola drinks, tea, coffee, fortified wine, beer, black-current juice, condensed milk, lemon juice and brine. If an adhesive film is stuck on and pulled off, there is no delamination from the substrate.

An interesting application of the dispersions of the invention is the coating of copolymer films of the type used, for example, as cover sheeting in marketgardens and in agriculture. The short hardening time at elevated temperatures makes it possible to coat the films as they are wound off one roll and onto another roll. Coated polyethylene films have increased transparency. It has also been found that the electrostatic charging of coated films is less than that of uncoated films. As a result the deposition of dust and similar foreign bodies is slowed down, and the films retain their high transparency for a longer period.

The following Examples illustrate the invention in more detail.

EXAMPLE 1

(a) Preparation of a polyurethane dispersion 787 g of a polyester obtained from neopentyl glycol and maleic anhydride and having a hydroxyl number of 173 and an acid number of 2 are heated to 100° C. together with 939 g of a polyester obtained from adipic acid and neopentyl glycol and having a hydroxyl number of 98 and an acid number of 3, and the water is stripped off in vacuo. 1,048 g of 4,4'-dicyclohexylmethane diisocyanate are added at 80° C. The mixture is stirred at 90° C. for 1 hour. Afterwards the NCO content is 5.93%. When the mixture has cooled down to 60° C., a solution of 134 g of dimethylolpropionic acid and 102 g of triethylamine in 800 g of N-methylpyrrolidone are added and stirred in at 90° C. for 1 hour. The resulting material is added with thorough stirring to 40,000 g of cold water to give a finely divided dispersion. 160 g of a 30% strength aqueous solution of ethylenediamine are added at 40° C. with thorough stirring in the course of 20 minutes to give a dispersion having a solids content of 37% by weight.

(b) Preparation of the hydrolyzed shellac 115 cm³ of ammonia are passed into 2,500 g of cold water, and 1,000 g of bleached-white pulverulent shellac are then stirred in. The mixture is raised to 50° to 60° C. with stirring. The shellac dissolves within 25 to 30 minutes. The solution obtained is filtered.

(c) Preparation and application of a coating material 50 parts by weight of the dispersion of (a), 35 parts by weight of the hydrolyzed shellac of (b), 11 parts by weight of a commercially available anionic wetting agent and, as emulsifier, 4 parts by weight of a commercially available fatty alcohol ethoxylate are mixed by stirring.

The dispersion obtained is doctored by means of a doctor blade onto a polyethylene film in a wet-film thickness of 30 μm. The film which has been applied is dried at 75° C. in the course of 25 seconds. The resulting coating adheres firmly, increases the transparency of the polyethylene film, and is highly solvent-resistant.

EXAMPLE 2

896 g of a polyester obtained from neopentyl glycol, maleic anhydride and adipic acid in a molar ratio of maleic anhydride:adipic acid=1:1 and having a hydroxyl number of 125 and an acid number of 3 are stripped of water in vacuo at 100°. 524 g of dicyclohexylmethane diisocyanate are added at 80° C. The mixture is stirred at 90° C. for 1 hour. Afterwards the NCO content is 5.48%. A solution of 67 g of dimethylolpropionic acid and 51 g of triethylamine in 500 g of N-methylpyrrolidone is added. The material is stirred at 90° C. for 1 hour and is then added with thorough stirring to 2,200 g of cold water to give a finely divided dispersion. 80 g of a 30% strength aqueous solution of ethylenediamine are added at 40° C. in the course of 20 minutes to give a dispersion having a solids content of 35% by weight.

45 parts by weight of this polyurethane dispersion, 40 parts by weight of the hydrolyzed shellac of Example 1(b), 11 parts by weight of a wetting agent and 4 parts by weight of an emulsifier are mixed with one another by stirring. The resulting coating material is applied to bituminous board and hardened at 80° C. The coating obtained provides the board with excellent insulation. It prevents bitumen from diffusing out at elevated temperatures, as is normally observed for this type of board.

What we claim is:

1. In an aqueous dispersion based on a polyurethane synthetic resin obtained by reacting (a) a hydroxyl-containing polyester with (b) a diisocyanate to form a first intermediate product and reacting said first intermediate product with (c) a compound which contains at least two groups which react with isocyanate groups and at least one group capable of anion formation to form a second intermediate product, and with a chain-lengthening agent, the improvement comprising:
   said hydroxyl-containing polyesters (a) comprising an unsaturated linear polyester or a mixture of an unsaturated linear polyester with a linear diol, said polyester having a molecular weight of 500 to 2,000, said polyester, or said mixture, containing at least 0.4 olefinically unsaturated double bonds per 1,000 molecular weight units, said first intermediate product having terminal isocyanate groups, said second intermediate product having terminal isocyanate groups, said group capable of anion formation having been neutralized by means of a tertiary amine before reaction, said second intermediate product transferred into a predominantely aqueous phase, and said isocyanate groups of said second intermediate product reacted with a diamine, polyamine or mixture thereof having primary amino groups, secondary amino groups or mixtures thereof, and subsequently added to said aqueous phase, as a further binder, base-hydrolyzed shellac, where in each case, based on the solids content, said polyurethane synthetic resin content is 40 to 70% by weight, said hydrolyzed shellac content is 60 to 30% by weight, and said polyurethane synthetic resin content and said hydrolyzed shellac content add up to 100%.

2. The dispersion of claim 1, which contains wetting agents, emulsifiers or mixtures thereof in an amount of 1 to 25% by weight, based on the total weight of dispersion.

3. The dispersion of claim 2, wherein said unsaturated polyester is a polyester of maleic anhydride and a diol.

4. The dispersion of claim 3, wherein said diisocyanate is aliphatic, cycloaliphatic or a mixture thereof.

5. The dispersion of claim 4, wherein said compound (c) is a dihydroxycarboxylic acid or a dihydroxysulfonic acid.

6. The dispersion of claim 4, wherein said compound (c) is a diaminocarboxylic acid or a diaminosulfonic acid.

7. The dispersion of claim 6, wherein said hydrolyzed shellac is the hydrolyzation product of shellac and an aqueous ammonia solution.

8. In a process for preparing an aqueous dispersion based on a polyurethane synthetic resin comprising reacting (a) a hydroxyl-containing polyester with (b) a diisocyanate to give a first intermediate product and reacting said first intermediate product with (c) a compound which contains at least two groups which react with isocyanate groups and at least one group capable of anion formation to give a second intermediate product and with a chain-lengthening agent, the improvement comprising:

said hydroxyl-containing polyesters (a) comprising an unsaturated linear polyester or a mixture of an unsaturated linear polyester with a linear diol, said polyester having a molecular weight of 500 to 2,000, said polyester, or said mixture, containing at least 0.4 olefinically unsaturated double bonds per 1,000 molecular weight units, said first intermediate product having terminal isocyanate groups, said second intermediate product having terminal isocyanate groups, said group capable of anion formation having been neutralized with a tertiary amine before reaction, said second intermediate product transferred into a predominantly aqueous phase, and said isocyanate groups of said second intermediate product reacted with a diamine, polyamine or mixture thereof having primary amino groups, secondary amino groups or mixtures thereof subsequently adding base-hydrolyzing shellac to said aqueous phase, and mixing said dispersion of said polyurethane synthetic resin with said hydrolyzed shellac to produce a solids content based on said polyurethane synthetic resin of 40 to 70% by weight and based on said hydrolyzed shellac of 60 to 30% by weight, the total amount of said polyurethane synthetic resin content and said hydrolyzed shellac content being 100%.

9. The process of claim 8, further comprising adding wetting agents, emulsifiers or mixtures thereof in an amount of 1 to 25% by weight, based on the total weight of dispersion.

10. The process of claim 9, wherein said unsaturated polyester is a polyester of maleic anhydride and a diol.

11. The process of claim 10, wherein said diisocyanate is aliphatic or cycloaliphatic.

12. The process of claim 11, wherein said compound (c) is a dihydroxycarboxylic acid or a dihydroxysulfonic acid.

13. The process of claim 11, wherein said compound (c) is a diaminocarboxylic acid or a diaminosulfonic acid.

14. The process of claim 13, wherein said hydrolyzed shellac is the reaction product of shellac and an aqueous ammonia solution.

15. In a process for preparing coatings by applying to a substrate an aqueous dispersion based on a polyurethane synthetic resin obtained by reacting (a) a hydroxyl-containing polyester with (b) a diisocyanate to form a first intermediate product and reacting said first intermediate product with (c) a compound which contains at least two groups which react with isocyanate groups and at least one group capable of anion formation and with a chain-lengthening agent, and then hardening the applied dispersion, the improvement comprising:

said hydroxyl-containing polyester comprising an unsaturated linear polyester or a mixture of an unsaturated linear polyester with a linear diol, said polyester having a molecular weight of 500 to 2,000, said polyester, or said mixture, containing at least 0.4 olefinically unsaturated double bonds per 1,000 molecular weight units, said first intermediate product having terminal isocyanate groups, said second intermediate product having terminal isocyanate groups, said group capable of anion formation having been neutralized by means of a tertiary amine before reaction, said second intermediate product transferred into a predominantly aqueous phase, and said isocyanate groups of said second intermediate product reacted with a diamine, polyamine or mixture thereof having primary amino groups, secondary amino groups or mixtures thereof, and subsequently added to said aqueous phase, as a further binder, base-hydrolyzed shellac, where, in each case, based on the solids content, said polyurethane synthetic resin content is 40 to 70% by weight, said hydrolyzed shellac content is 60 to 30% by weight, and said polyurethane synthetic resin content and said hydrolyzed shellac content add up to 100%.

16. The process of claim 15, wherein said dispersion contains 1 to 25% by weight, based on the total amount of all components, of wetting agents, emulsifiers or mixtures thereof.

17. The process of claim 16, wherein said unsaturated polyester is a polyester of maleic anhydride and a diol.

18. The process of claim 17, wherein said diisocyanate is aliphatic, cycloaliphatic or a mixture thereof.

19. The process of claim 18, wherein said compound (c) is a dihydroxycarboxylic acid or a dihydroxysulfonic acid.

20. The process of claim 18, wherein said compound (c) is a diaminocarboxylic acid or a diaminosulfonic acid.

21. The process of claim 20, wherein said hydrolyzed shellac is the reaction product of an aqueous ammonia solution and shellac.

* * * * *